(12) United States Patent
Ohashi et al.

(10) Patent No.: US 8,092,097 B2
(45) Date of Patent: Jan. 10, 2012

(54) RETAINED ROLLER ASSEMBLY

(75) Inventors: Izumi Ohashi, Iwata (JP); Sadatsune Kazama, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 12/929,716

(22) Filed: Feb. 10, 2011

(65) Prior Publication Data

US 2011/0135237 A1 Jun. 9, 2011

Related U.S. Application Data

(63) Continuation of application No. PCT/JP2009/003740, filed on Aug. 5, 2009.

(30) Foreign Application Priority Data

Aug. 12, 2008 (JP) ................................. 2008-207793

(51) Int. Cl.
*F16C 33/46* (2006.01)
(52) U.S. Cl. ........................................ 384/580; 384/470
(58) Field of Classification Search .................. 384/580, 384/572, 576, 470
See application file for complete search history.

(56) References Cited

U.S. PATENT DOCUMENTS

| | | |
|---|---|---|
| 4,623,270 A | 11/1986 | Olschewski et al. |
| 5,772,338 A | 6/1998 | Hillmann et al. |
| 6,039,475 A | 3/2000 | Furukawa et al. |
| 2001/0003548 A1* | 6/2001 | Straub et al. ................ 384/580 |
| 2002/0097939 A1* | 7/2002 | Matsuyama et al. .......... 384/572 |

FOREIGN PATENT DOCUMENTS

| | | |
|---|---|---|
| JP | 61-27310 | 2/1986 |
| JP | 7-103240 | 4/1995 |
| JP | 7-151153 | 6/1995 |
| JP | 7-293569 | 11/1995 |
| JP | 9-72341 | 3/1997 |

OTHER PUBLICATIONS

International Search Report for PCT/JP2009/003740 mailed Oct. 27, 2009.
English Translation of the International Preliminary Report on Patentability dated Mar. 17, 2011 in corresponding International Patent Application PCT/JP2009/003740.

* cited by examiner

*Primary Examiner* — Thomas R Hannon

(57) ABSTRACT

A retained roller assembly, capable of facilitating the lubricating functionality, includes a cylindrical roller retainer having a plurality of pockets defined therein and arranged in a circumferential direction thereof, rollers accommodated within those pockets, respectively, and a roller retaining projection formed in opening edges of side faces, opposite to each other in the circumferential direction and situated on an inner diametric side and an outer diametric side, respectively. A roller guide face for guiding the corresponding roller is provided at an axial position on the side faces of each of the pockets that are different from the associated roller retaining projection. An annular recessed portion is provided in axially opposed ends of an inner diametric surface of the retainer so as to deploy over the entire periphery of the retainer.

9 Claims, 9 Drawing Sheets

RETAINED ROLLER ASSEMBLY

CROSS REFERENCE TO THE RELATED APPLICATION

This application is a continuation application, under 35 U.S.C. §111(a), of international application No. PCT/JP2009/003740, filed Aug. 5, 2009, which claims priority to Japanese patent application No. 2008-207793, filed Aug. 12, 2008, the disclosure of which are incorporated by reference in their entirety into this application.

BACKGROUND OF THE INVENTION

1. Field of the Invention

The present invention relates to a retained roller assembly that is used under a system in which lubricant is supplied from outside and, more particularly, to a retained roller assembly for use in a roller bearing employed in various industrial machines and equipments.

2. Description of the Related Art

The retained roller assembly of the type referred to above has been well known, in which a plurality of needle rollers are accommodated within respective pockets, defined in a cylindrical roller retainer in a fashion spaced an equal distance in a direction circumferentially of the roller retainer, and in which the retainer has pairs of inner and outer roller holders defined therein, each pair being defined in respective opposite side faces of the corresponding pocket while the inner and outer roller holder of each pair are positioned on outer and inner diametric sides of the roller retainer. (See, for example, the Patent Document 1 listed below.) According to the Patent Document 1, the outer roller holders on the outer diametric side and the inner roller holders on the inner diametric side are disposed at respective positions differing from each other in a direction axially of the roller retainer so that a lubricant oil can flow into each of the pockets through between the neighboring roller holders to thereby increase a lubricating function.

The retainer needle roller assembly provided with roller holders on outer and inner diametric sides of circumferentially opposed side faces of each of the pockets is suggested in, for example, the Patent Document 2 listed below. According to the Patent Document 2, an axially intermediate portion and opposite ends of the side faces of each of the pockets are provided with cutouts with each of the rollers positioned between the opposite ends and the cutout at the intermediate portion and, at the same time, a circumferentially extending groove is provided at a portion of an outer diametric surface of the retainer corresponding to the cutouts at the intermediate portion to thereby increase the lubricating function.

[Patent Document 1] JP Laid-open Patent Publication No. H07-293569
[Patent Document 2] JP Laid-open Patent Publication No. H07-103240

SUMMARY OF THE INVENTION

According to the retainer needle roller assembly of any of the above described construction, although lubrication can be facilitated as a result that the flow of the lubricant oil into the pockets has been improved, conditions of use of the retained roller assembly have now become severe and, therefore, the lubricating function is desired to be further facilitated.

An object of the present invention is intended to provide a retained roller assembly of a kind capable of increasing the lubricating function.

In order to accomplish the foregoing object, the present invention provides a retainer roller assembly including a roller retainer of a cylindrical shape having a plurality of pockets defined therein and arranged in a circumferential direction thereof, each of the pockets having side faces opposed to each other in the circumferential direction; rollers accommodated within the respective pockets; an inner diametric side roller retaining projection formed on an inner diametric side of an opening edge of each of the side faces, and an outer diametric side roller retaining projection formed on an outer diametric side of an opening edge of each of the side faces; and a roller guide face for guiding the corresponding roller, provided at an axial position of the side faces of each of the pockets that is different from axial positions of the associated roller retaining projections According to this construction, since the roller guide face for guiding the roller is provided at the axial position on the side faces of each of the pockets that are different from the associated roller retaining projection, a space for facilitating the flow of the lubricant oil can be created around the roller retaining projection. Therefore, the lubricating functionality can be increased.

In one embodiment of the present invention, the roller guide face may be provided at opposite end positions of the side faces of each of the pockets that are axially outwardly from the roller retaining projection. In the case of this construction, skewing of the rollers can be reduced.

In one embodiment of the present invention, the roller retainer may be made of a resinous material and the inner diametric side roller retaining projection and the associated outer diametric side roller retaining projection may be so arranged that an axial position of a portion of the inner diametric side roller retaining projection and an axial position of a potion of the outer diametric side roller retaining projection are overlapped with each other. When the roller retaining projections on the inner and outer diametric sides, respectively are provided at the position where they are partially overlapped with each other, even as the roller retaining projection of a length sufficient to secure the stabilized roller retaining function, the possibility of the roller retaining projections hampering the flow of the lubricant oil into and out from the pockets can be avoided.

In one embodiment of the present invention, the outer diametric side roller retaining projection may be provided at two locations at respective positions on opposite end sides in the axial direction of the side face, and the inner diametric side roller retaining projection may be provided at one location intermediately of the axial direction of the side face so as to be partially overlapped with respective axial portions of the outer diametric side roller retaining projections at the two locations. In the case of this construction, a further stabilized roller retaining function and a good flow of the lubricant oil into and out of the pockets can be obtained.

In one embodiment of the present invention, a plurality of inner diametric side roller retaining projections may be provided and those inner diametric side roller retaining projections may be spaced from each other in the axial direction. If the number of the inner diametric side roller retaining projection is plural, as compared with the use of one axially long roller retaining projection, a good flow of the lubricant oil into and out of the pockets can be obtained.

In one embodiment of the present invention, portions of the side face on which the inner diametric side roller retaining projection and outer diametric side roller retaining projection of each of the pockets are formed may be flush with a portion of the side face on which the roller guide face is formed. By so doing, designing and manufacturing of the roller retainer can be facilitated.

In one embodiment of the present invention, an annular recessed portion depressed radially outwardly relative to an intermediate portion in the axial direction may be provided in axially opposed ends of an inner diametric surface of the retainer so as to deploy over the entire periphery of the retainer, and an axially inner side end of each of the annular recessed portions may be positioned on a side of an axially intermediate portion relative to the roller guide face and on a side of the roller guide face relative to the inner diametric side roller retaining projection.

In one embodiment of the present invention, the radial depth dimension of the annular recessed portion is chosen to be of a value effective to avoid separation of each of the rollers from the associated roller retaining projection even when such roller is displaced towards the inner diametric side.

In any one of the foregoing constructions according to the present invention, a plurality of recess portions may be formed in an outer diametric surface of the retainer in a fashion dispersed and some of those plural recess portions may be rendered to be continued to the opening edges of the pockets.

According to this construction, flow of the lubricant toil into the pockets through the recess portioned in the outer diametric surface of the roller retainer can be facilitated and, therefore, the lubricating functionality can be increased.

Where the plural recess portions are provided in the retainer outer diametric surface as described above, some or all of the plural recess portions may be connected with each other to form unitary recessed area. In the case of this construction, since a flow path for the lubricant oil to flow towards the pockets through the recess portions can be formed, flow of the lubricant oil into the pockets can be further facilitated.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE PREFERRED EMBODIMENTS

Figure 1A:
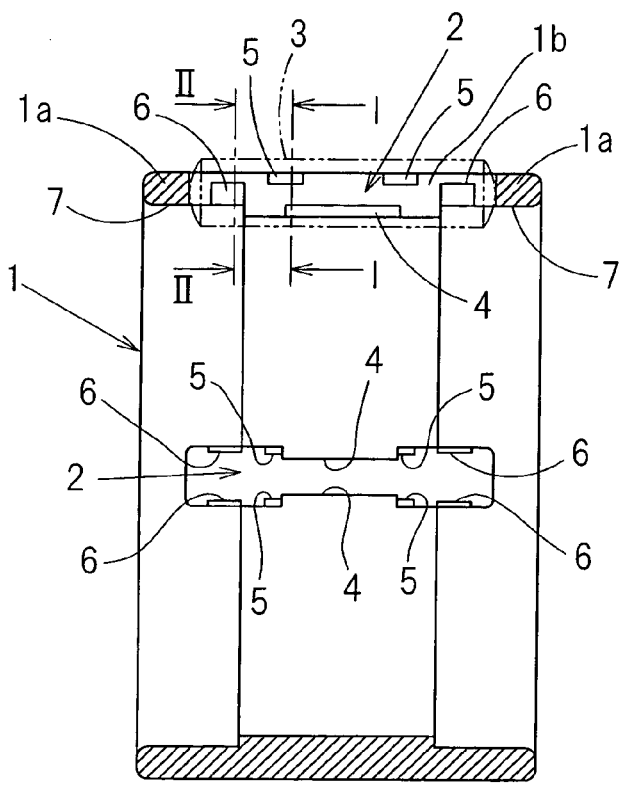
FIG. 1A is a sectional view showing a retained roller assembly according to a first embodiment of the present invention.
Figure 1B:
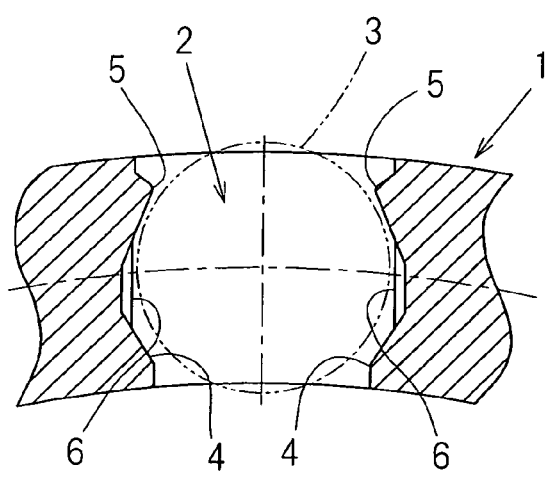
FIG. 1B is a cross sectional view, on an enlarged scale, that is taken along the line I-I in FIG. 1A.

A first embodiment of the present invention will now be described in detail with particular reference to FIGS. 1A to 1C and FIGS. 2A and 2B. The retained roller assembly shown therein is a retained needle roller assembly including a roller retainer 1 of a substantially cylindrical shape, having a plurality of pockets 2 defined therein, and a needle roller 3 accommodated in each of the pockets 2. The roller retainer 1 is in the form of a cylindrical molded product made of a synthetic resin, and the pockets 2 accommodating therein the corresponding rollers 3 are so formed as to deploy in a fashion spaced a distance from each other in a circumferential direction of the roller retainer 1. Each of the pockets 2 is formed in the roller retainer 1 so as to open completely across the thickness of the roller retainer 1 in a radial direction and is positioned at a respective portion of the roller retainer intermediate of the length as measured in an axial direction. With those pockets 2 so formed as hereinabove described, the roller retainer 1 represents such a generally ladder shaped configuration including annular portions 1a on opposite sides thereof and a plurality of pillar portions 1b connecting the opposite annular portions 1a together and each positioned between the neighboring pockets 2. It is to be noted that in FIG. 1A showing a sectional representation of the roller retainer 1, only some of the pockets 2 is shown while the remaining pockets are not shown for the sake of brevity. FIG. 1B illustrates, on an enlarged scale, a cross sectional representation taken along the line I-I in FIG. 1A. Each of the pockets 2 has side faces opposite to each other in a direction circumferentially of the roller retainer 1, which are respectively provided with roller retaining projections 4 and 5 that are defined in associated opening edges on the inner diametric side and the outer diametric side. Also, the pocket side faces are provided with roller guide faces 6 for guiding the corresponding roller 3.

The inner diametric side roller retaining projection 4 and the outer diametric side roller retaining projection 5 are so positioned that an axial position of a portion of the inner diametric side roller retaining projection 4 and an axial position of a portion of the outer diametric side roller retaining projection 5 overlap with each other. Specifically, the outer diametric side roller retaining projection 5 is provided at two locations at respective positions on opposite end sides in the axial direction of the side face. On the other hand, the inner diametric side roller retaining projection 4 is provided at one location which is intermediate of the axial direction of the side face so as to be partially overlapped with respective axial portions of the outer diametric side roller retaining projections 5 and 5, which are positioned at the two locations as described above, in the axial direction.

The roller guide face 6 is provided at two locations on each of the side faces of each of the pockets 2 and adjacent the opposite end portions of the respective side face and axially outwardly of the associated roller retaining projections 4 and 5, respectively. Also, portions of the side face on which the roller retaining projections 4 and 5 on the opposite side faces of each of the pockets 2 are formed are flush with a portion of the side face, on which the roller guide face 6 is formed. The roller guide face 6 forms a face locally protruding from that portion of each of the side faces of each of the pockets, which is flush therewith.

Figure 1C:
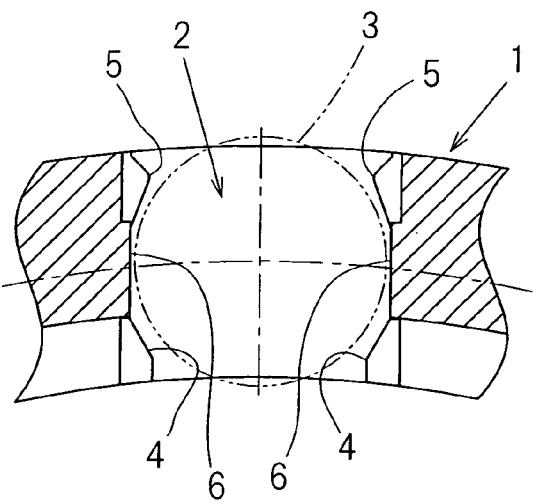
FIG. 1C is a cross sectional view, on an enlarged scale, that is taken along the line II-II in FIG. 1A.

One example of the sectional shape of the roller guide face 6 is shown in FIG. 1C. As shown therein, the roller guide face 6 is represented by a tip end face of the protruding portion and is contained by a plane parallel to a plane at a center in the widthwise direction of each of the pockets 2 (a plane containing the retainer center). The roller guide face 6 is not necessarily limited to such as described above, but may be, for example, a flat inclined face inclined towards the retainer outer diametric side or the retainer inner diametric side, or may be formed as a curved face which has a section representing an arcuate shape having a radius of curvature slightly greater than the radius of curvature of each of the rollers 3.

Figure 2A:
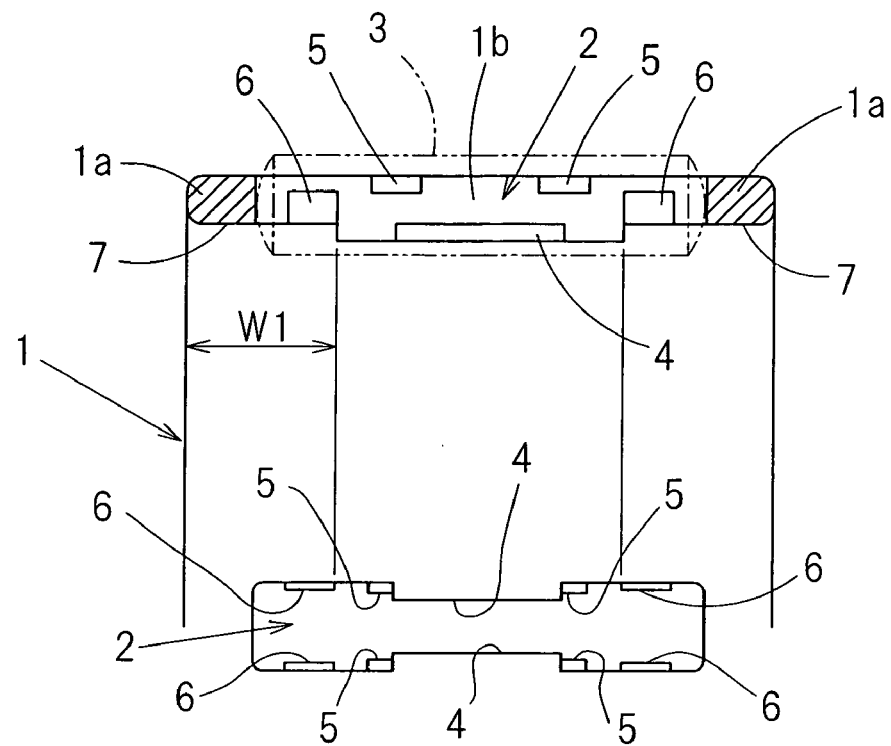
FIG. 2A is an explanatory diagram showing the width of one of grooves defined in a retainer employed in the retained roller assembly.
Figure 2B:
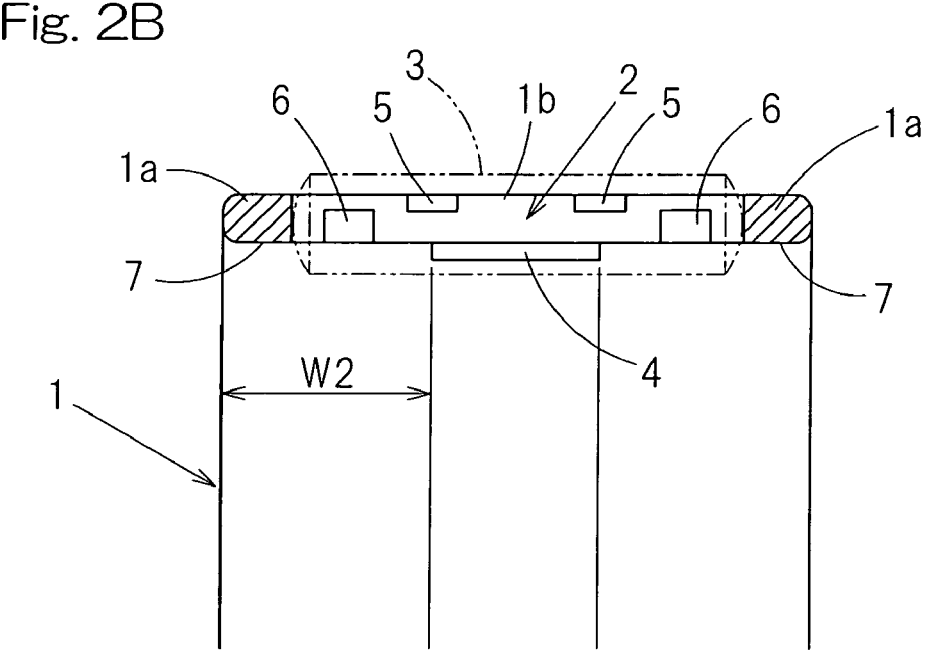
FIG. 2B is an explanatory diagram showing the width of one of grooves defined in a retainer employed in the retained roller assembly.

An annular recessed portion 7 depressed radially outwardly relative to an intermediate portion in the axial direction is provided in each of portions of an inner diametric surface of the roller retainer 1 in the axially opposite end portions so as to extend over the entire circumference of the roller retainer 1. The annular recessed portion 7 has a width greater than that of the corresponding annular portion 1a and is rendered to be a width over the entirety of the corresponding portion 1a and a portion of the corresponding pillar portion 1b. More specifically, the widthwise dimension of each of the annular recessed portioned portions 7 is rendered to be within the range from W1 to W2 as shown in FIGS. 2A and 2B. FIGS. 2A and 2B illustrate respective examples, in which each of the annular recessed portioned portions 7 has the minimum width and the maximum width, but within the permissible range, respectively. In other words, the width of the annular recessed portion 7 may be range from the lower limit width W1, which is obtained when an axial inner end of the annular recessed portion 7 is set to the axial position of the axial inner end of the roller guide face 6 as shown in FIG. 2A, to the upper limit width W2, which is obtained when the axial inner end of the annular recessed portion 7 is set to the axial position of the outer end of the inner diametric side roller retaining projection 4 as shown in FIG. 2B. It is to be noted that if the radial depth of each of the annular recessed portioned portions 7 increases, the inner diametric side end of each of the roller guide faces 6 will be set back radially outwardly, and, accordingly, the possibility will arise that the roller 3 may separate from the roller guide faces 6. In view of this, the radial depth of each of the annular recessed portioned portions 7 is chosen to be a value enough to avoid an undesirable separation of the roller 3 from the corresponding roller guide faces 6 even when such roller 3 displaces radially inwardly.

As hereinabove described, since in the retained roller assembly according to the foregoing embodiment, the roller guide faces 6 for guiding the rollers 3 are provided at the axial positions of the side faces of the pockets 2 that are different from those of the roller retaining projections 4 and 5, a space, in which a lubricant oil can flow easily, will be created around the roller retaining projections, resulting in increase of the lubricating functionality.

Since according to the foregoing embodiment, the roller guide faces 6 referred to above are provided in opposite end portions of the side face that are axially outwardly of the roller retaining projections 4 and 5 in the side faces of each of the pockets 2, skewing of the rollers can be advantageously reduced.

Figure 3A:
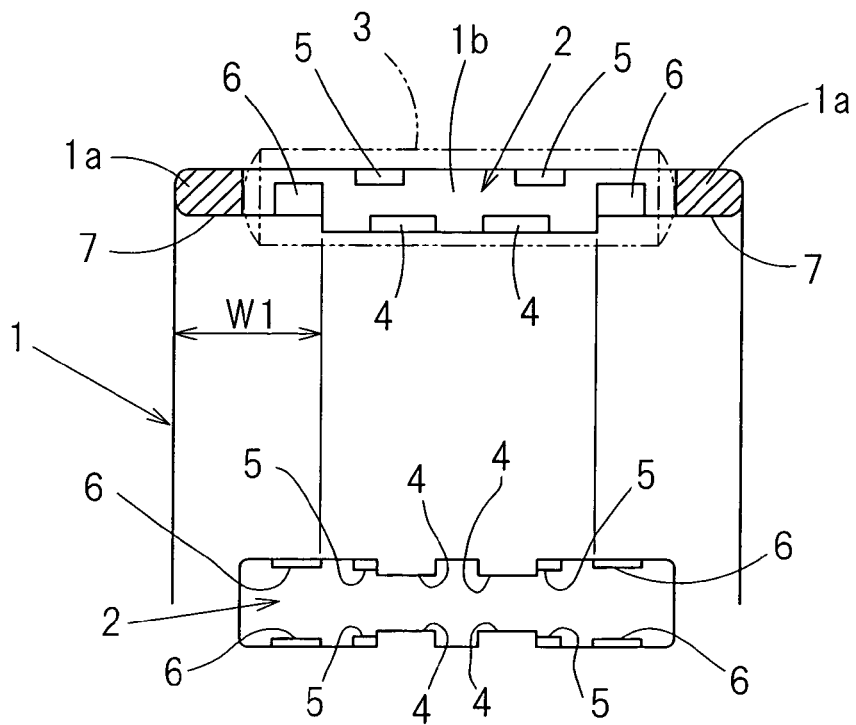
FIG. 3A is a sectional view showing the retainer employed in the retained roller assembly according to a second embodiment of the present invention.
Figure 3B:
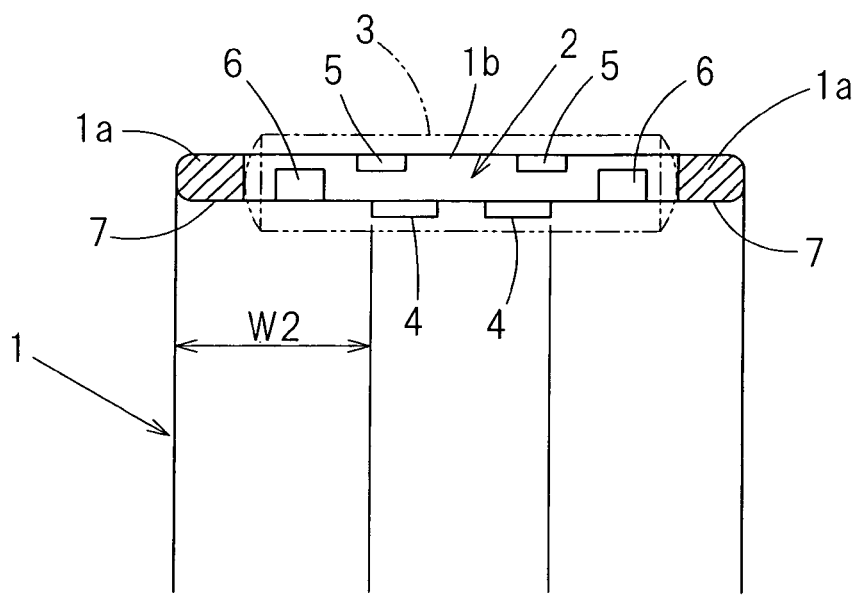
FIG. 3B is a sectional view showing the retainer employed in the retained roller assembly according to a third embodiment of the present invention.

It is to be noted that although in the foregoing embodiment only one inner diametric side roller retaining projection 4 has been shown and described, the inner diametric side roller retaining projection 4 may be provided in a plural number, in which cases those roller retaining projections should be axially spaced from each other as shown in FIGS. 3A and 3B in connection with second and third embodiments. FIGS. 3A and 3B illustrate respective examples, in which the annular recessed portioned portions 7 are so chosen to have the minimum width and the maximum width within the permissible range, respectively.

If the inner diametric side roller retaining projection 4 is employed in a plural number with those roller retaining projections 4 spaced from each other as shown therein, as compared with the case where only one roller retaining projection 4, which is elongated in the axial direction, is provided as is the case with the foregoing embodiment, a favorable flow of the lubricant oil from or into each of the pockets can be obtained.

Figure 4A:
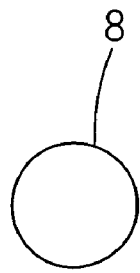
FIG. 4A is a top plan view showing recess portions defined in an outer diametric surface of the retainer employed in the retained roller assembly according to a fourth embodiment of the present invention.
Figure 4B:
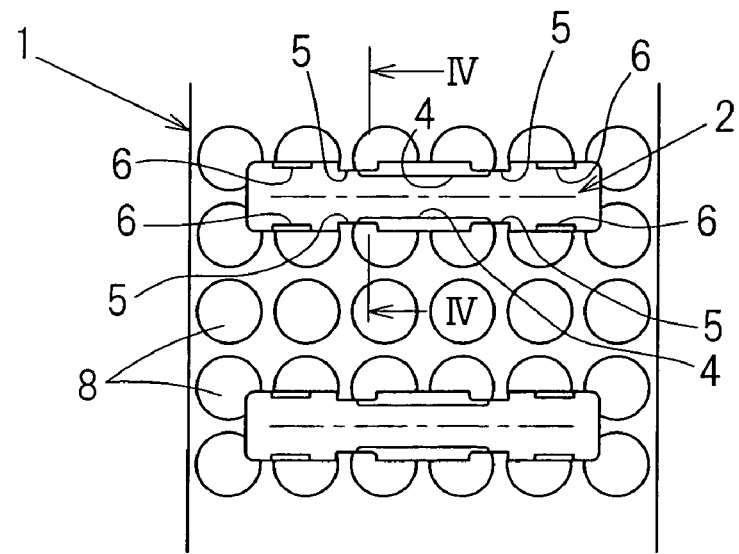
FIG. 4B is a front elevational view showing the outer diametric surface of the retainer shown in FIG. 4A.
Figure 4C:
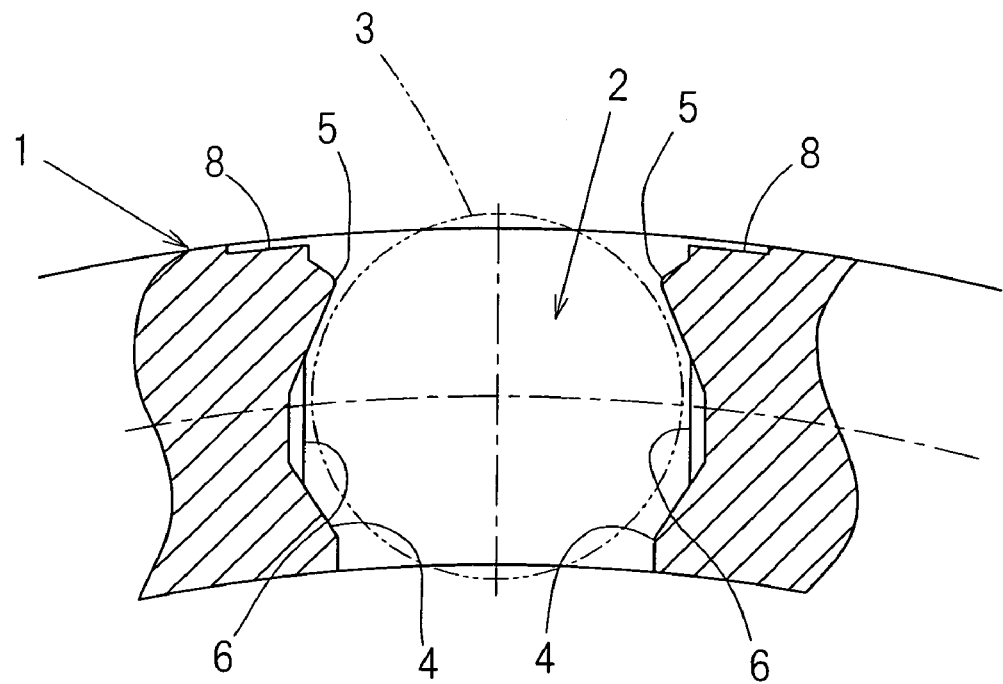
FIG. 4C is a cross sectional view, on an enlarged scale, that is taken along the line IV-IV in FIG. 4B.

FIGS. 4A to 4C illustrate a fourth embodiment. The retained roller assembly according to this fourth embodiment is similar to the retained roller assembly shown and described in connection with the first embodiment with reference to FIGS. 1A to 1C, but differs therefrom in that the outer diametric surface of the roller retainer 1 is formed with a plurality of recess portions 8, having a plane shape representing a circular shape in a plan view as best shown in FIG. 4A, which recess portions 8 are arranged having been dispersed in circumferential and axial directions as best shown in FIG. 4B. FIG. 4C represents a cross sectional view taken along the line IV-IV in FIG. 3B. Of those plural recess portions 8, some of them are rendered to be continued to respective opening edges of the pockets 2. Other structural features than those described above are similar to those shown and described in connection with the first embodiment with reference to FIGS. 1A to 1C.

Where the plural recess portions 8 are formed in the outer diametric surface of the roller retainer 1 in a fashion having been dispersed as hereinabove described, flow of the lubricant oil into the pockets 2 can be facilitated through those recess portions 8 and, therefore, the lubricating functionality can be increased.

Figure 5:
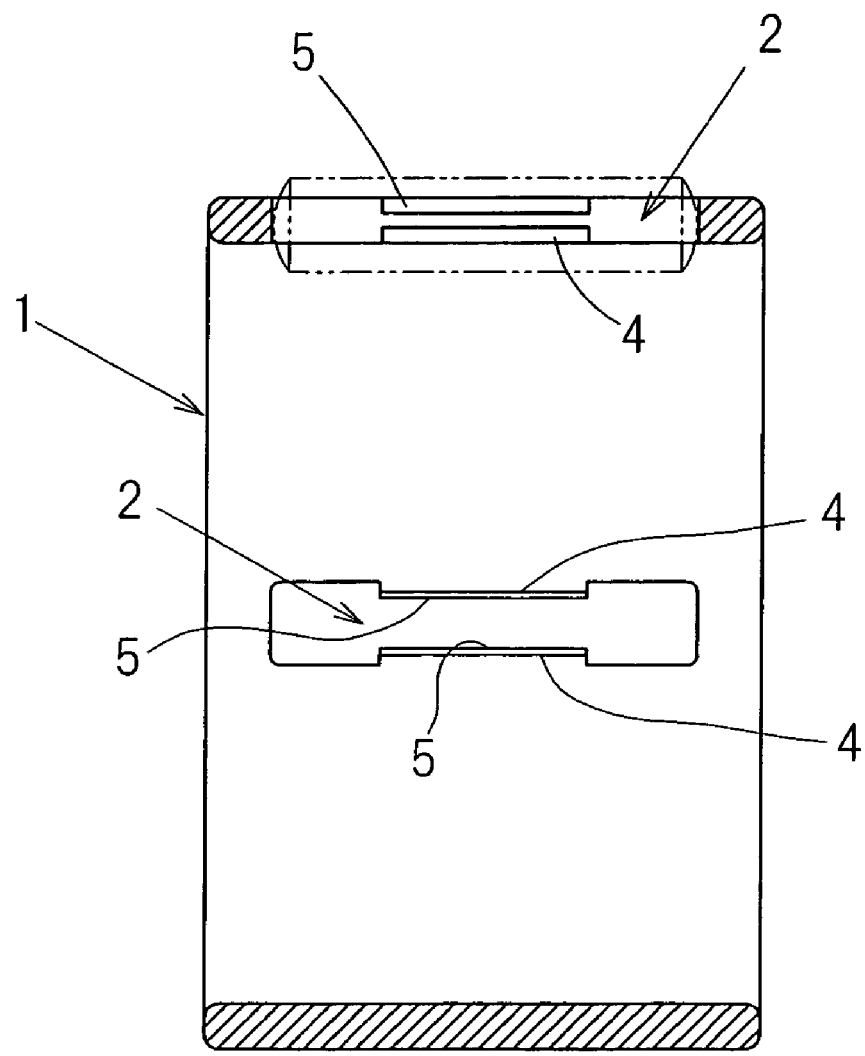
FIG. 5 is a sectional view showing the retainer roller assembly according to a suggested example.
Figure 6A:
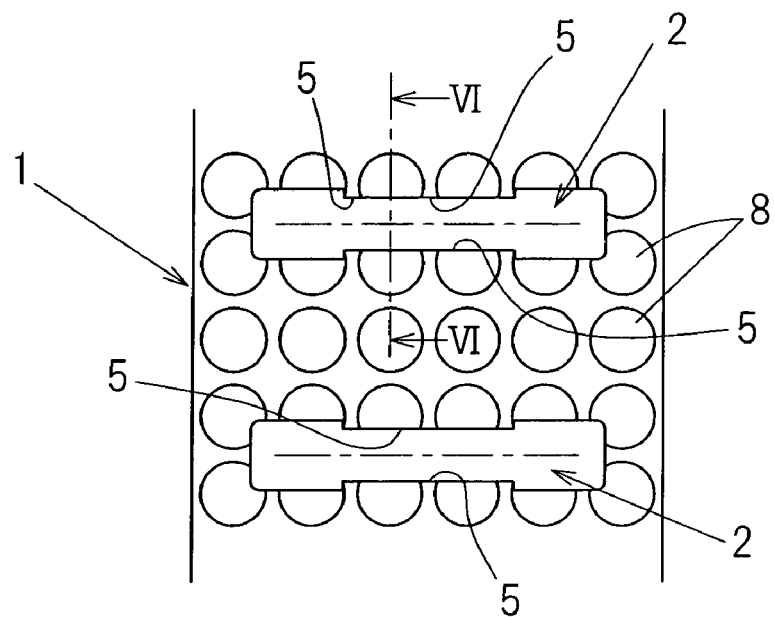
FIG. 6A is a front elevational view showing the outer diametric surface of the retainer employed in the retained roller assembly according to the suggested example shown in FIG. 5.
Figure 6B:
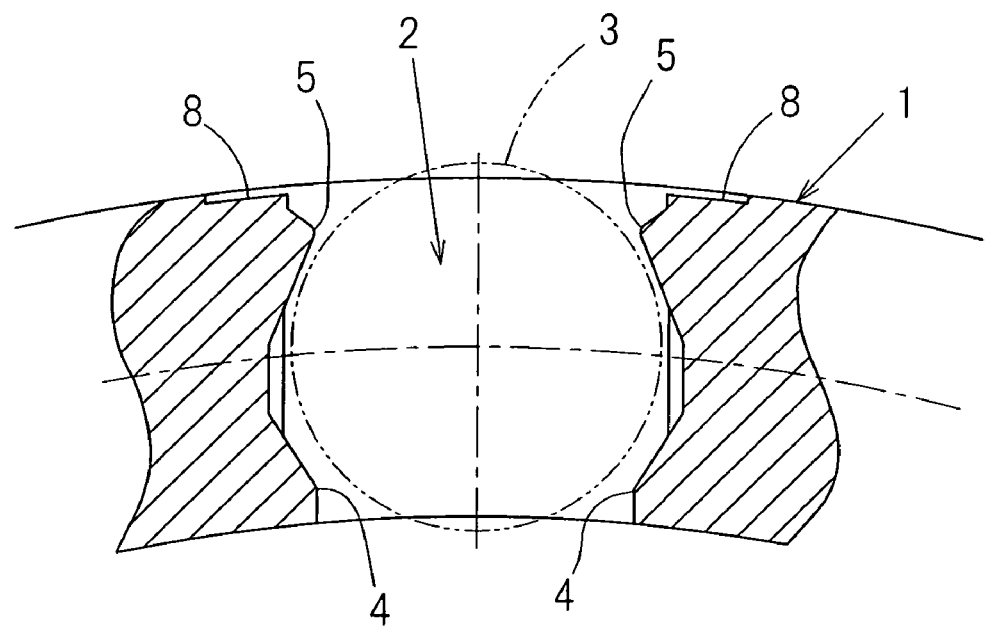
FIG. 6B is a cross sectional view, on an enlarged scale, that is taken along the line VI-VI in FIG. 6A.

FIG. 5, FIGS. 6A and 6B illustrate a suggested example for reference purpose. This suggested example is similar to the fourth embodiment shown in and described with reference to FIGS. 4A to 4C, but differs therefrom in that the roller guide faces 6 are dispensed with. In other words, the retained roller assembly according to this suggested example is a retained needle roller assembly of a type in which needle rollers 3 are accommodated within respective pockets 2 defined in a cylindrical roller retainer 1. The roller retainer 1 is in the form of a cylindrical molded product made of a synthetic resin, and the pockets 2 accommodating therein the corresponding rollers 3 are so formed as to deploy in a fashion spaced a distance from each other in a direction circumferentially of the roller retainer 1. It is to be noted that FIG. 5 showing a sectional representation of the roller retainer 1 shows only two of the pockets 2. Side faces of each of the pockets 2, which are opposite to each other in a direction circumferentially of the roller retainer 1, are respectively provided with roller retaining projections 4 and 5 that are defined in associated opening edges on the inner diametric side and the outer diametric side. The roller retaining projections 4 and 5 on the inner diametric side and the outer diametric side, respectively, are provided at one location at a position intermediate of the axial direction. No roller guide face such as the roller guide faces 6 employed in and described in connection with the first embodiment with reference to FIGS. 1A and 1B is employed in this suggested example. The outer diametric surface of the roller retainer 1 is formed with a plurality of recess portions 8, representing a circular shape in a plan view as best shown in FIG. 4A, which recess portions 8 are arranged having been dispersed in circumferential and axial directions, as best shown in FIG. 6A, in a manner similar to those employed in the first embodiment shown in and described with reference to FIGS. 2A and 2B. FIG. 6B illustrates a cross sectional view taken along the line VI-VI in FIG. 6A. Of the plural recess portions 8, some of them are rendered to be continued to opening edges of the pockets 2.

Even with this suggested example, as is the case with the first embodiment shown in and described with reference to FIGS. 2A and 2B, flow of the lubricant oil into the pockets 2 can be facilitated through those recess portions 8 and, therefore, the lubricating functionality can be increased.

Figure 7A:
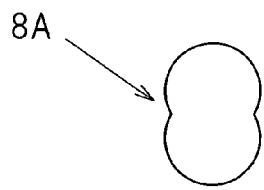
FIG. 7A is a top plan view showing a first structure example of the recess portions defined in the outer diametric surface of the retainer employed in the retained roller assembly according to the suggested example shown in FIG. 6A.
Figure 7B:
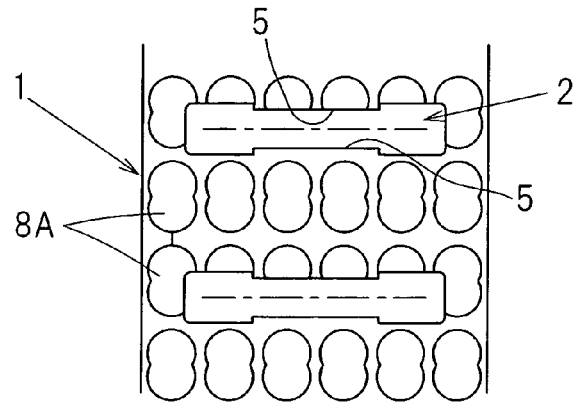
FIG. 7B is a top plan view showing the outer diametric surface of the retainer provided with the recess portions shown in FIG. 7A.

FIGS. 7A and 7B illustrate a first structure example of the recess portions 8 in the retainer outer diametric surface that are employed in the retained roller assembly according to the suggested example shown in and described with reference to FIG. 6A. According to this first structure, the plural recess portions 8A each in the form of two circles, which are partially overlapped with each other to define a generally trochoidal shape, are arranged in the outer diametric surface of the roller retainer 1, having been dispersed in the circumferential and axial directions when viewed in a plane as best shown in FIG. 7A. Some of the recess portions 8A are rendered to be continued to the opening edges of the pockets 2.

Even in the case of this first structure example, flow of the lubricant oil into the pockets 2 can be facilitated through the dispersed recess portions 8A and, therefore, the lubricating functionality can be increased.

Figure 8A:
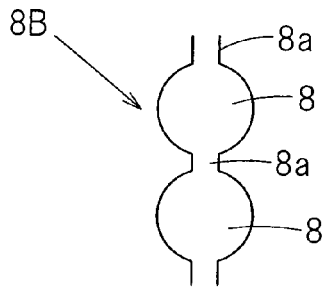
FIG. 8A is a top plan view showing a second structure example of the recess portions defined in the outer diametric surface of the retainer employed in the retained roller assembly.
Figure 8B:
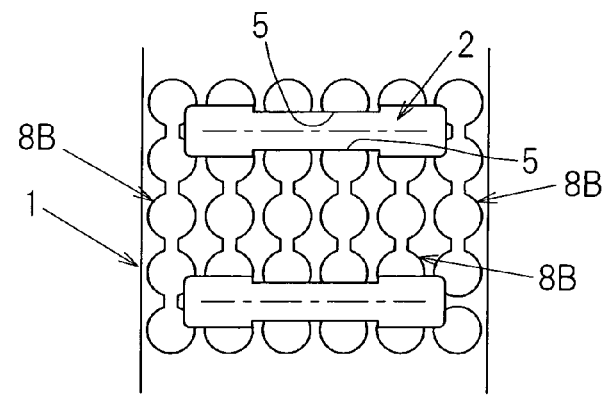
FIG. 8B is a top plan view showing the outer diametric surface of the retainer provided with the recess portions shown in FIG. 8A.

FIGS. 8A and 8B illustrate a second structure example of the recess portions 8 in the retainer outer diametric surface that are employed in the retained roller assembly according to the suggested example shown in and described with reference to FIG. 6A. In this second structure, the plural recess portions 8 each in the form of circles, which are arranged in the circumferential direction when viewed in a plane as best shown in FIG. 8A and which are connected with each other through grooved portions 8a to form a unitary recessed area 8B, and the unitary recessed areas 8B are arranged in the axial direction. Some of recessed areas 8B are rendered to be continued to the opening edges of the pockets 2.

Even in the case of this second structure example, flow of the lubricant oil into the pockets 2 can be facilitated through the recessed areas 8B and, therefore, the lubricating functionality can be increased.

Figure 9A:
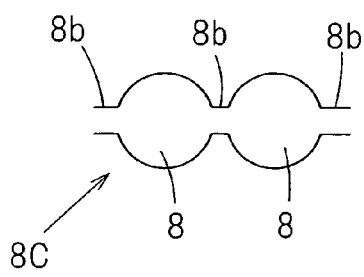
FIG. 9A is a top plan view showing a third structure example of the recess portions defined in the outer diametric surface of the retainer employed in the retained roller assembly.
Figure 9B:
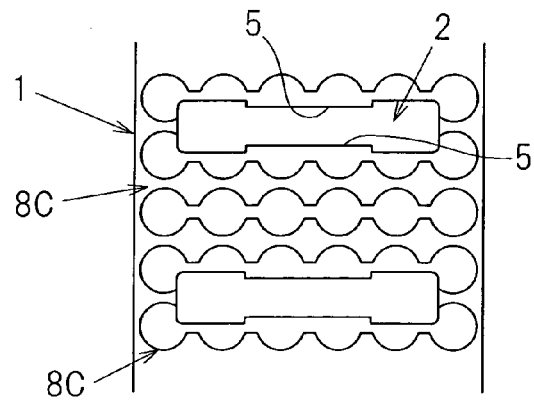
FIG. 9B is a top plan view showing the outer diametric surface of the retainer provided with the recess portions shown in FIG. 9A.

FIGS. 9A and 9B illustrate a third structure example of the recess portions 8 in the retainer outer diametric surface that are employed in the retained roller assembly according to the suggested example shown in and described with reference to FIG. 6A. In this third structure, the plural recess portions 8 each in the form of circles, which are arranged in the axial direction when viewed in a plane as best shown in FIG. 9A and which are connected with each other through grooved portions 8b to define a unitary recessed area 8C, and the unitary recessed areas 8C are arranged in the circumferential direction. Some of recessed areas 8C are rendered to be continued to the opening edges of the pockets 2.

Even in the case of this third structure example, flow of the lubricant oil into the pockets 2 can be facilitated through the recessed areas 8C and, therefore, the lubricating functionality can be increased.

Figure 10A:
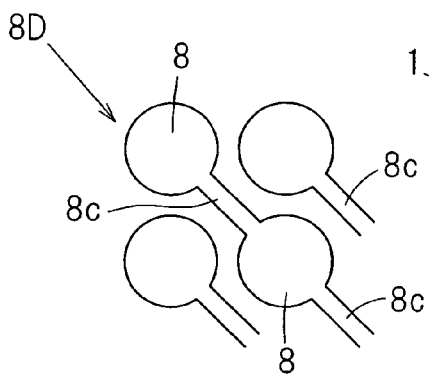
FIG. 10A is a top plan view showing a fourth structure example of the recess portions defined in the outer diametric surface of the retainer employed in the retained roller assembly.
Figure 10B:
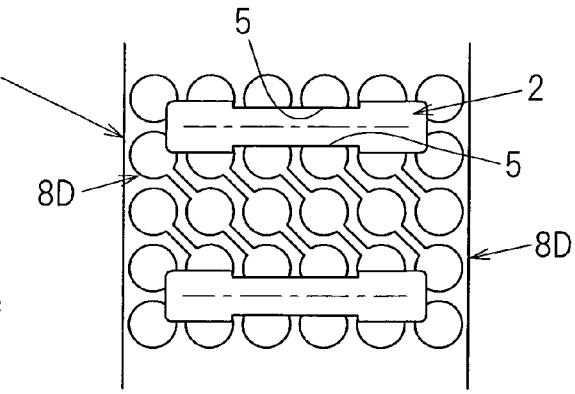
FIG. 10B is a top plan view showing the outer diametric surface of the retainer provided with the recess portions shown in FIG. 10A.

FIGS. 10A and 10B illustrate a fourth structure example of the recess portions 8 in the retainer outer diametric surface that are employed in the retained roller assembly according to the suggested example shown in and described with reference to FIG. 6A. In this fourth structure, of the plural recess portions 8 each in the form of circles, which are arranged in the circumferential direction and the axial direction when viewed in a plane as best shown in FIG. 10A, the plural recess portions 8 which are arranged diagonally are connected with each other through grooved portions 8c to define a unitary recessed area 8D. Some of recessed areas 8D are rendered to be continued to the opening edges of the pockets 2.

Even in the case of this fourth structure example, flow of the lubricant oil into the pockets 2 can be facilitated through the recessed areas 8D and, therefore, the lubricating functionality can be increased.

Figure 11A:
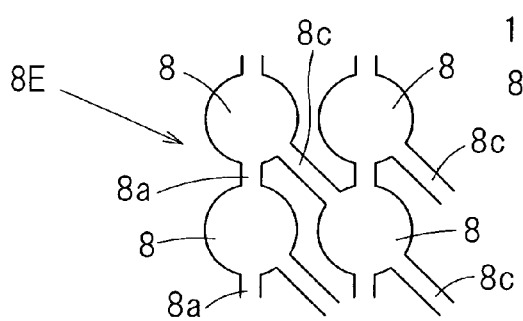
FIG. 11A is a top plan view showing a fifth structure example of the recess portions defined in the outer diametric surface of the retainer employed in the retained roller assembly.
Figure 11B:
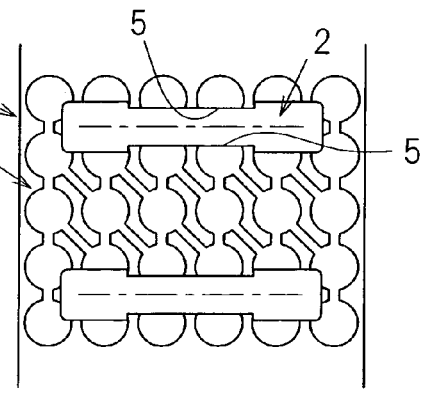
FIG. 11B is a top plan view showing the outer diametric surface of the retainer provided with the recess portions shown in FIG. 11A.

FIGS. 11A and 11B illustrate a fifth structure example of the recess portions 8 in the retainer outer diametric surface that are employed in the retained roller assembly according to the suggested example shown in and described with reference to FIG. 6A. In this fifth structure, of the plural recess portions 8 that are arranged in the circumferential direction and the axial direction when viewed in a plane as best shown in FIG. 11A, not only are the plural recess portions 8, which are arranged in the circumferential direction, connected with each other through grooves portions 8a, but also the plural recess portions 8, which are arranged diagonally, are connected with each other through grooved portions 8c, to thereby define unitary recessed areas 8E. Some of recessed areas 8E are rendered to be continued to the opening edges of the pockets 2.

Even in the case of this fifth structure example, flow of the lubricant oil into the pockets 2 can be facilitated through the recessed areas 8E and, therefore, the lubricating functionality can be increased.

Figure 12A:
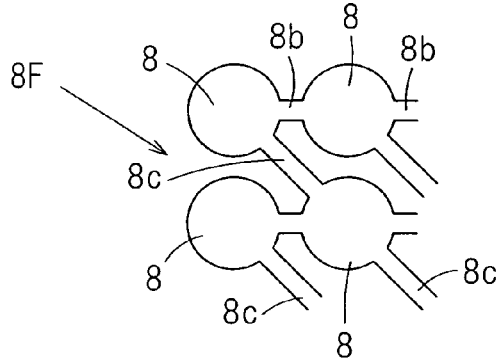
FIG. 12A is a top plan view showing a sixth structure example of the recess portions defined in the outer diametric surface of the retainer employed in the retained roller assembly.
Figure 12B:
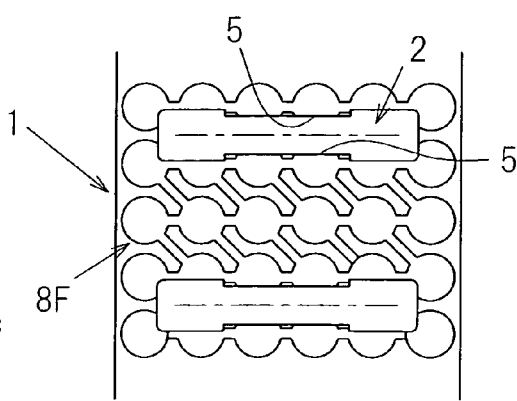
FIG. 12B is a top plan view showing the outer diametric surface of the retainer provided with the recess portions shown in FIG. 8A.

FIGS. 12A and 12B illustrate a sixth structure example of the recess portions 8 in the retainer outer diametric surface that are employed in the retained roller assembly according to the suggested example shown in and described with reference to FIG. 6A. In this sixth structure, of the plural recess portions 8 that are arranged in the circumferential direction and the axial direction when viewed in a plane as best shown in FIG. 12A, not only are the plural recess portions 8, which are arranged in the axial direction, connected with each other through grooves portions 8b, but also the plural recess portions 8, which are arranged in the diagonal direction, are connected with each other through grooved portions 8c, to thereby define unitary recessed areas 8F. Some of recessed areas 8F are rendered to be continued to the opening edges of the pockets 2.

Even in the case of this sixth structure example, flow of the lubricant oil into the pockets 2 can be facilitated through the recessed areas 8F and, therefore, the lubricating functionality can be increased.

Figure 13A:
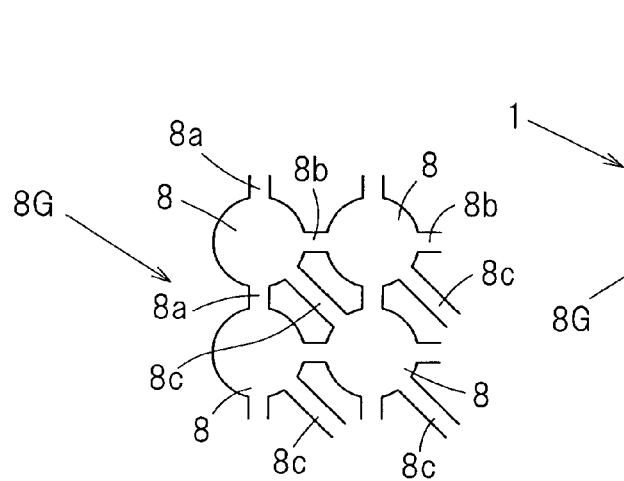
FIG. 13A is a top plan view showing a seventh structure example of the recess portions defined in the outer diametric surface of the retainer employed in the retained roller assembly.
Figure 13B:
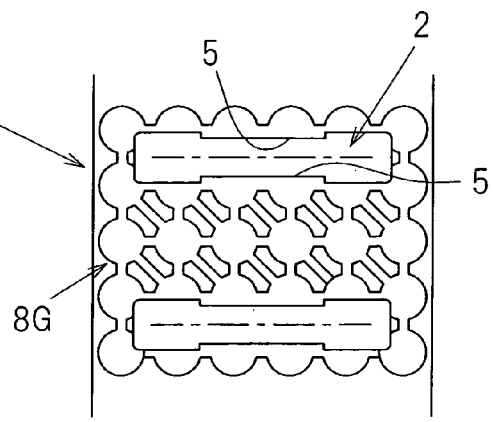
FIG. 13B is a top plan view showing the outer diametric surface of the retainer provided with the recess portions shown in FIG. 13A.

FIGS. 13A and 13B illustrate a seventh structure example of the recess portions 8 in the retainer outer diametric surface that are employed in the retained roller assembly according to the suggested example shown in and described with reference to FIG. 6A. In this seventh structure, of the plural recess portions 8 that are arranged in the circumferential direction and the axial direction when viewed in a plane as best shown in FIG. 13A, not only are the plural recess portions 8, which are arranged in the circumferential direction, connected with each other through grooves portions 8a, but also the plural recess portions 8, which are arranged in the axial direction, are connected with each other through grooved portions 8b and the plural recess portions 8, which are arranged in the diagonal direction, are also connected with each other through grooved portions 8c, to thereby define unitary recessed areas 8G. Some of recessed areas 8G are rendered to be continued to the opening edges of the pockets 2.

Even in the case of this seventh structure example, flow of the lubricant oil into the pockets 2 can be facilitated through the recessed areas 8G and, therefore, the lubricating functionality can be increased.

Figure 14A:
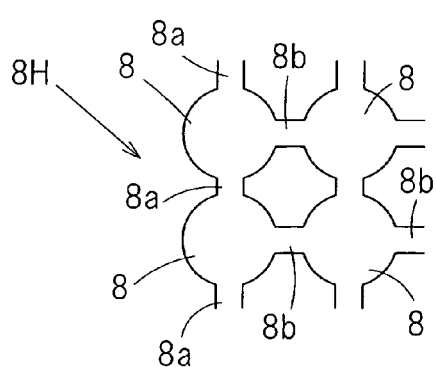
FIG. 14A is a top plan view showing an eighth structure example of the recess portions defined in the outer diametric surface of the retainer employed in the retained roller assembly.
Figure 14B:
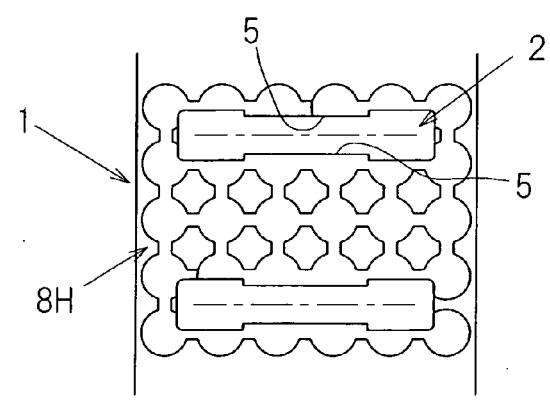
FIG. 14B is a top plan view showing the outer diametric surface of the retainer provided with the recess portions shown in FIG. 14A.

FIGS. 14A and 14B illustrate an eighth structure example of the recess portions 8 in the retainer outer diametric surface that are employed in the retained roller assembly according to the suggested example shown in and described with reference to FIG. 6A. In this eighth structure, of the plural recess portions 8 that are arranged in the circumferential direction and the axial direction when viewed in a plane as best shown in FIG. 14A, not only are the plural recess portions 8, which are arranged in the circumferential direction, connected with each other through grooves portions 8a, but also the plural recess portions 8, which are arranged in the axial direction, are connected with each other through grooved portions 8b, to thereby define unitary recessed areas 8H. Some of recessed areas 8H are rendered to be continued to the opening edges of the pockets 2.

Even in the case of this eighth structure example, flow of the lubricant oil into the pockets 2 can be facilitated through the recessed areas 8H and, therefore, the lubricating functionality can be increased.

It is to be noted that the recess portions 8A and the recessed areas 8B to 8H, shown in and described with references to FIGS. 7A and 7B to FIGS. 14A and 14B in connection with the first to eighth structures, respectively, may be applied to the outer diametric surface of the roller retainer employed in the retained roller assembly according to the first embodiment shown in and described with reference to FIGS. 1A and 1B.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1: Roller retainer
2: Pockets
3: Needle roller
4: Inner diametric side roller retaining projection
5: Outer diametric side roller retaining projection
6: Roller guide face
7: Annular recessed portion
8, 8A: Recess portion
8B to 8H: Recessed area

What is claimed is:
1. A retained roller assembly, which comprises:
a roller retainer of a cylindrical shape having a plurality of pockets defined therein and arranged in a circumferential direction thereof, each of the pockets having side faces opposed to each other in the circumferential direction;
rollers accommodated within the respective pockets;
an inner diametric side roller retaining projection formed on an inner diametric side of an opening edge of each of the side faces, and an outer diametric side roller retain- ing projection formed on an outer diametric side of an opening edge of each of the side faces; and a roller guide face for guiding the corresponding roller, provided at an axial position of the side faces of each of the pockets that is different from axial positions of the associated roller retaining projections, wherein an annular recessed portion depressed radially outwardly relative to an intermediate portion in the axial direction is provided in axially opposed ends of an inner diametric surface of the retainer so as to deploy over the entire periphery of the retainer, and wherein an axially inner side end of each of the annular recessed portions is positioned on a side of an axially intermediate portion relative to the roller guide face and on a side of the roller guide face relative to the inner diametric side roller retaining projection.

2. The retained roller assembly as claimed in claim 1, wherein the roller guide face is provided on opposite end portions of the side faces of each of the pockets that are positioned axially outwardly from the roller retaining projections.

3. The retained roller assembly as claimed in claim 1, wherein the roller retainer is made of a resinous material and the inner diametric side roller retaining projection and the associated outer diametric side roller retaining projection are so arranged that an axial position of a portion of the inner diametric side roller retaining projection and an axial position of a potion of the outer diametric side roller retaining projection are overlapped with each other.

4. The retained roller assembly as claimed in claim 3, wherein the outer diametric side roller retaining projection is provided at two locations at respective positions on opposite end sides in the axial direction of the side face, and the inner diametric side roller retaining projection is provided at one location intermediately of the axial direction of the side face so as to be partially overlapped with respective axial portions of the outer diametric side roller retaining projections at the two locations.

5. The retained roller assembly as claimed in claim 1, wherein a plurality of inner diametric side roller retaining projections are provided and those inner diametric side roller retaining projections are spaced from each other in the axial direction.

6. The retained roller assembly as claimed in claim 1, wherein portions of the side face on which the inner diametric side roller retaining projection and outer diametric side roller retaining projection of each of the pockets are formed is flush with a portion of the side face on which the roller guide face is formed.

7. The retained roller assembly as claimed in claim 1, wherein the radial depth dimension of the annular recessed portion is chosen to be of a value effective to avoid separation of each of the rollers from the associated roller guide face under a condition in which the roller is displaced towards the inner diametric side.

8. The retained roller assembly as claimed in claim 1, wherein a plurality of recess portions are formed in an outer diametric surface of the retainer in a fashion dispersed and some of those recess portions are continued to the opening edges of the pockets.

9. The retained roller assembly as claimed in claim 8, wherein some or all of the plural recess portions are connected with each other to form unitary recessed area.

* * * * *

UNITED STATES PATENT AND TRADEMARK OFFICE
CERTIFICATE OF CORRECTION

| | | |
|---|---|---|
| PATENT NO. | : 8,092,097 B2 | |
| APPLICATION NO. | : 12/929716 | |
| DATED | : January 10, 2012 | |
| INVENTOR(S) | : Izumi Ohashi et al. | |

It is certified that error appears in the above-identified patent and that said Letters Patent is hereby corrected as shown below:

Claims

Column 11, Line 29, In Claim 3, delete "potion" and insert -- portion --, therefor.

Signed and Sealed this
Thirteenth Day of October, 2015

Michelle K. Lee
*Director of the United States Patent and Trademark Office*